United States Patent Office 3,836,651
Patented Sept. 17, 1974

3,836,651
NOVEL ORAL CONTRACEPTIVE COMBINATION
Harry W. Rudel and Fred A. Kincl, New York, N.Y., assignors to Biological Concepts, Inc., New York, N.Y.
No Drawing. Filed Feb. 22, 1972, Ser. No. 228,365
Int. Cl. A61k 17/00
U.S. Cl. 424—239
8 Claims

ABSTRACT OF THE DISCLOSURE

A method for the control of the ovulatory cycle comprises administering orally to a woman during a period of at least about 28 days in consecutive sequence, beginning on the fifth day of the menstrual cycle, and continuing for a period of 20 to 21 days thereafter, a daily single dosage of a combination of about 1 part by weight of an estrogenic substance and from about 7 to 14 parts by weight of a progestational substance, the amount of estrogenic substance, expressed as ethynyl estradiol, or equivalent thereof, being not more than 0.05 mg. per day.

BACKGROUND OF THE INVENTION

The present invention relates to a novel oral contraceptive combination and a method for its administration.

The control or prevention of ovulation in women, and hence of unwanted pregnancy, by means of orally administered contraceptive medication is now widely accepted and practiced. The basic principle involved is that of utilizing synthetic estrogenic and progestational substances to produce the same effects as the corresponding natural hormones. At a certain point in the reproductive process, the pituitary gland secretes follicle-stimulating hormones (FSH) and luteinizing hormones (LH). Following the release of the ovum by the rupture of the follicle, and secretion of the estrogen estradiol, the folloicle cell is transformed into the corpus luteum, with secretion of progesterone. Natural progesterone is believed to be involved in the process of endometrial growth. The natural estrogens and progesterone inhibit the secretion of FSH and LH during pregnancy and thus inhibit ovulation. The complete cycle takes place in about 28 days.

The known methods of ovulation control or prevention have usually involved the oral administration of combined progestational and estrogenic substances at some stage of the cycle. One method, known as combined treatment, involves administering a combination of progestational and estrogenic substances usually on the fifth day after the beginning of the menstrual period, and prior to ovulation, for a period of about 20 to 21 days, followed by a cessation until the next cycle. It is generally accepted that the contraceptive effect is achieved by inhibition of ovulation.

The previously known combined oral contraceptives intended for daily dosage, usually in the form of a pill, have almost always employed a dosage of estrogenic substance ranging from 0.05 mg. to 0.15 mg., generally about 0.075 mg. per day. The corresponding daily dosage of progestational substance in the combination has usually been between 1 and 5 mg. This is illustrated by reference to Table 4a in Chapter 34 of the publication entitled "Oral Contraceptives: Human Fertility Studies and Side Effects," by Harry W. Rudel and Fred A. Kincl, in the International Encyclopedia of Pharmacology and Therapeutics, Section 48, Volume 2, published by Pergamon Press, Oxford, England (1972).

It has been recognized in the art that the presence of an estrogenic substance in the combined oral contraceptives contributes markedly to their very contraceptive efficacy. Although progestational substances have been used alone to prevent unwanted pregnancy, the efficacy of such preparations has been found to be low compared to combined contraceptives.

It has been long believed in the art that the minimal effective dosage of an orally effective estrogenic substance, such as ethynyl estradiol or mestranol (ethynyl estradiol 3-methyl ether) is at least 0.05 mg. per day. It has become widely accepted that oral contraceptives containing less than this amount would not provide effective contraceptive protection, and would be, in effect, inactive.

Thus, for example, Martinez-Manautou and Rudel reported in 1966 ("Ovulation," pp. 243–258, R. B. Greenblatt editor, published by J. B. Lippincott, Baltimore, Md.) that a daily dose of 0.02 mg. of ethynyl estradion only incompletely inhibited ovulation, whereas a dose of 0.05 mg. per day was effective. Jackson and co-workers reported in 1968 (J. L. Jackson, W. T. Spain and H. Payne, "Fertility and Sterility," Vol. 19, pp. 649–653) that 0.1 mg. of ethynyl estradiol per day was needed for ovulation inhibition in all patients studied; a daily dose of 0.05 mg. produced ovulation block in only 77 percent of the patients. Stevens and co-workers (V. C. Stevens, J. W. Goldzieber and N. Vorys, American Journal of Obstetrics and Gynecology, Vol. 102, pp. 95–105 (1968)) reported that a daily dose of 0.06 mg. of mestranol was anti-ovulatory, but not in all patients.

GENERAL DESCRIPTION OF THE INVENTION

In accordance with the present invention there is provided a novel combination of estrogenic and progestational substances for the control or prevention of ovulation and pregnancy and a method for the administration thereof, which permits the use of greatly reduced amounts of both the estrogenic and progestational substances while at the same time providing a high degree of contraceptive protection to the user.

The preparation of the invention comprises a single daily dosage of a combination of about 1 part by weight of an estrogenic substance and from about 7 to 14 parts by weight of a progestational substance, the amount of estrogenic substance, expressed as ethynyl estradiol, or equivalent thereof, being not more than 0.05 mg. per day.

In accordance with the presently preferred practice of the invention, the optimal daily dosage of estrogenic substance, expressed as ethynyl estradiol, to control or prevent ovulation, is from about 0.02 mg. to about 0.045 mg. per day, and preferably from about 0.03 mg. to about 0.04 mg. per day. The preferred estrogenic substance is ethynyl estradiol itself, but this can be substituted by mestranol using about the same dosage amounts.

As mentioned above, the proportion of progestational substance is from about 7 to about 14 parts by weight per 1 part of estrogenic substance, preferably about 9 parts by weight.

The preferred progestational substance is norethindrone ($17\alpha$-ethynyl-$17\beta$-hydroxy-4-estren-3-one), and the proportions mentioned are expressed in terms of norethindrone. The optimal dosage of progestational substance, expressed as norethindrone, is from about 0.25 mg. to about 0.5 mg. per day, preferably about 0.4 mg. per day. Other progestational agents which can be employed, in equivalent doses, in the practice of the invention, are advantageously the $17\alpha$-alkynyl derivatives of 19-nor-testosterone, such as, for example, norethindrone 17-acetate, ethynodiol diacetate ($117\alpha$-ethynyl-$3\beta$,$17\beta$-diacetoxy-4-estren), lynestrenol ($17\alpha$-ethynyl-4-estren-$17\beta$-ol), and norgestrel ($13\beta$-ethyl-$17\alpha$-ethynyl-$17\beta$-hydroxy-4-gonen-3-one). Other types of progestational agents which can be employed are those derived from $17\alpha$-acetoxyprogesterone, such as, for example, megestrol acetate (6-methyl-$17\alpha$-acetoxy-4,6-pregnadiene-3,20-dione) and chlormadinone acetate (6-chloro-$17\alpha$-acetoxy-4,6-pregnadiene-3,20-dione).

Because of the varying progestational potency of the various progestational agents mentioned, the amounts employed are adjusted to equivalent norethindrone dosage.

Thus, equivalent doses for norethindrone acetate and ethynodiol diacetate are from 1.3 to 2 times, but preferably 1.5 times that of norethindrone. For lynestrenol the equivalent dose is from 1.5 to 3 times, but preferably about 2 times that of norethindrone. For norgestrel the equivalent dose is from 0.1 to 0.5 but preferably about 0.25 that of norethindrone.

The contraceptive combination of the invention may be compounded with one or more pharmaceutically acceptable carriers and formed as pills, capsules, lozenges, and the like. Advantageously, the individual dosage units may be packaged in a suitable type of dispenser which contains an entire sequence. Preferably the dispenser is of the type conventionally employed in pharmaceutical practice, wherein the dosage unit is enclosed in a laminated strip of foil, which may be transparent. Thus, a plurality of sealed detachable pockets in the form of a strip is provided, each marked with a numeral, and each detachable along a tear line. The material of the package may be a plastic film such as polyvinyl chloride or polyethylene, capable of being heat sealed, or it may be a laminate of metal foil, such as aluminum foil-plastic laminate, heat sealed or bonded with adhesive along the outer edges and between adjacent pockets. Vitamins or iron compounds may be included if desired. Suitable carriers or binders, e.g. for tablets, include those conventionally employed for this purpose, such as lactose, glucose, sucrose, corn starch, potato starch, kaolin, and the like. The user is instructed to take one tablet or the like per day starting with the fifth day, and for 20 or 21 days thereafter.

DESCRIPTION OF THE PREFERRED EMBODIMENTS

The following examples and data illustrate the practice of the invention, but are not to be regarded as limiting:

Example 1

To determine the optimal amount of ethynyl estradiol to be used in combination with norethindrone, a study was undertaken in which norethindrone 0.4 mg. combined with either 0.05, 0.025 or 0.035 mg. of ethynyl estradiol was given cyclically (day 5 to 26) to normal, fertile women. The combination containing 0.035 mg. was the most acceptable from the standpoint of irregular or intermenstrual bleeding. Table 1 below summarizes the results.

TABLE 1.—THE INCIDENCE OF INTERMENSTRUAL BLEEDING FOR THREE COMBINATIONS OF NORETHINDRONE AND ETHYNYL ESTRADIOL

[Norethindrone dose 0.4 mg. daily]

| Combination [1] | Cycles studied | | |
|---|---|---|---|
| | 1 | 2 | 3 |
| EE [2] 0.015 mg.: | | | |
| Total number of patients | 13 | 2 | |
| Number spotting, percent | 30.8 | 50 | |
| Number breakthrough bleeding, percent | 38.5 | | |
| EE [2] 0.025 mg.: | | | |
| Total number of patients | 26 | 13 | |
| Number spotting, percent | 15.4 | 0 | 0 |
| Number breakthrough bleeding, percent | 19.2 | 30.8 | 16.7 |
| EE [2] 0.035 mg.: | | | |
| Total number of patients | 57 | 35 | 26 |
| Number spotting, percent | 7.0 | 0 | 0 |
| Number breakthrough bleeding, percent | 19.3 | 2.9 | 0 |

[1] Norethindrone dose 0.4 mg. daily.
[2] EE=ethynyl estradiol.

The above results indicate that a combination containing ethynyl estradiol-norethindrone in a ratio of about 1:9 was most acceptable.

Example 2.—Contraceptive Action

Eighty-seven sexually active women with ages ranging from 18–40 years old were studied. Of the total group, 20 had used other methods of family planning and were shifted to this study; the remaining ones never had previous contraception. All the women included were in good health and had no history of hormone contraindication.

The patients were instructed to take one tablet containing norethindrone 0.4 mg. and ethynyl estradiol 0.035 mg. every night for 21 days beginning on day 5 of the first treatment menstrual cycle, after which there was a rest period of 7 days. The patients were followed for 6 months. During this time no pregnancy occurred. The results are summarized below:

TABLE 2

| | |
|---|---|
| Number of patients | 87 |
| Total treatment menstrual cycles | 354 |
| Number of months | 6 |
| Pregnancies | 0 |
| Breakthrough bleeding, cycle 1 | 13 (15.2%) |
| Spotting, cycle 1 | 10 (13.3%) |

The above results indicate that a ethynyl estradiol 0.035 mg. given in combination with norethindrone in proportions of about 1:9 is an effective contraceptive preparation.

Example 3.—Effects on Pituitary Function

The effects of the administration of a tablet containing 0.035 mg. of ethynyl estradiol and 0.4 mg. of norethindrone on the pituitary function were studied in 5 normal, healthy young women volunteers. Each patient was observed during a one-month control cycle. Thereafter, the subjects were instructed to take one tablet daily for 20 days. In each patient, urine was collected daily and the following determinations were made: (1) excretion of pregnanediol in urine; (2) excretion of total estrogens in urine; (3) FSH; and (4) LH. Several blood samples were taken from each patient during the second part of the cycle for the determination of progesterone and LH in plasma.

The results of urine tests on the respective patients are summarized in the following table:

TABLE 3.—MEAN VALUES FOUND IN URINE

| | Pregnanediol day 22-26 mg./24 hrs. | Total estrogens day 20-25 mg./24 hrs. | FSH | LH |
|---|---|---|---|---|
| Control cycle | 4.3 | 30 | 17.2 | 73 |
| Rx cycle | 1.1 | 4 | 8.8 | 10 |
| Control cycle | 1.0 | 32 | 13.2 | 70 |
| Rx cycle | 0.4 | 3 | 6.3 | 31 |
| Control cycle | a 4.0 | 30 | b 14.5 | 55 |
| Rx cycle | 0.4 | 3 | b 60.0 | 22 |
| Control cycle | 4.7 | 25 | 23 | 174 |
| Rx cycle | 2.1 | 14 | 11 | 25 |
| Control cycle | 4.9 | 28 | 14.0 | 68 |
| Rx cycle | 1.4 | 5 | 12.4 | 25 | a Day 27-31 of the cycle.
b Day 7-12 of the cycle.

NOTE: FSH=First cycle week, I.U./24 hrs.; LH=highest value observed, I.U./24 hrs.

The data in the foregoing table indicate that the values for urinary pregnanediol, LH, FSH and total estrogens were markedly suppressed in all the patients early in the cycle. The inhibition of release of FSH and LH served to inhibit ovulation.

It was also found that the values of progesterone and LH in the plasma were significantly lower in all the patients during the tablet cycle as compared to the control values. These results are interpreted to indicate an inhibition of the pituitary function and of ovulation.

What is claimed is:

1. A method, which may result in some irregular or intermenstrual breakthrough bleeding or spotting in some individuals, for markedly suppressing urinary pregnanediol, LH, FSH and total estrogens in sexually active women early in the dosage cycle, said inhibition of release of LH and FSH serving to inhibit ovulation, with inhibition of ovulation and of the pituitary function indicated by significantly lowered values of progesterone and LH in the plasma in said women during the dosage cycle, said method for the control of the ovulatory cycle in women during a period of at least about 28 days, by a consecutive sequence of dosage units, comprising administering orally to a women, beginning on the fifth day following the first day of menstruation, and thereafter daily until the last day of the cycle a single unit dosage of a combination of about 1 part by weight of an estrogenic substance and from about 7 to about 14 parts by weight of a progestational substance, in optimal dosage of from about 0.25 mg. to about 0.5 mg. per day, the amount of estrogenic substance present, expressed as ethynyl estradiol, or the estrogenic equivalent thereof, being from about 0.02 mg. to 0.045 mg. per day.

2. The method of Claim 1 in which the estrogenic substance is ethynyl estradiol.

3. The method of Claim 1 in which the progestational substance is norethindrone.

4. The method of Claim 1 in which the estrogenic substance is mestranol.

5. A pharmaceutical preparation for the control of the ovulatory cycle in women and adapted for oral administration, in the form of a 20 or 21 day sequence of unit doses, each individual dosage unit comprising a combination of about 1 part by weight of an estrogenic substance and from about 7 to about 14 parts by weight of a progestational substance in optimal daily dosage of from about 0.25 mg. to about 0.5 mg. per unit dose, the amount of estrogenic substance present, expressed as ethynyl estradiol or the estrogenic equivalent thereof, being from about 0.02 mg. to 0.045 mg. per unit dose.

6. The preparation of Claim 5 in which the estrogenic substance is ethynyl estradiol.

7. The preparation of Claim 5 in which the progestational substance is norethindrone.

8. The preparation of Claim 6 in which the estrogenic substance is mestranol.

References Cited

UNITED STATES PATENTS

| 3,409,721 | 11/1968 | Applezweig | 424—239 |
|---|---|---|---|
| 3,502,772 | 3/1970 | Ijzerman | 424—239 |
| 3,568,828 | 3/1971 | Lerner | 206—42 |

OTHER REFERENCES

Apelo et al.: Contraception, 2(6):391–400 (1970), "Results of a Controlled Study Employing D-Norgestrel (0.25 mg.) and Ethynyl estradiol (0.05 mg.): A New Oral Contraception Combination."

Grase et al.: Deutsche Modizinische Woch. 94:590–8 (1969), "Uber Einen Ovulationshemmer mit Extrem Niedriger Gestagendosis" (Mit 0.05 mg. Ethinylöstradiol und 0.5 mg. Norgestrel).

SHEP K. ROSE, Primary Examiner

U.S. Cl. X.R.

424—239

Dedication 3,836,651.—*Harry W. Rudel* and *Fred A. Kincl*, New York, N.Y. NOVEL ORAL CONTRACEPTIVE COMBINATION. Patent dated Sept. 17, 1974. Dedication filed Oct. 3, 1977, by the assignee, *Biological Concepts, Inc.*

Hereby dedicates to the Public the entire remaining term of said patent.
[*Official Gazette December 6, 1977.*]